(12) United States Patent
Tsukamoto

(10) Patent No.: US 8,720,200 B2
(45) Date of Patent: May 13, 2014

(54) MULTISTAGE SUPERCHARGING SYSTEM CONTROL APPARATUS

(75) Inventor: Yoshihisa Tsukamoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 196 days.

(21) Appl. No.: 13/210,927

(22) Filed: Aug. 16, 2011

(65) Prior Publication Data

US 2011/0296830 A1   Dec. 8, 2011

Related U.S. Application Data

(63) Continuation of application No. PCT/JP2009/054821, filed on Mar. 6, 2009.

(51) Int. Cl.
    *F02D 23/00*  (2006.01)
    *F02B 33/44*  (2006.01)
    *F02B 33/00*  (2006.01)

(52) U.S. Cl.
    USPC ............... 60/602; 60/612; 123/562

(58) Field of Classification Search
    USPC .................... 60/602, 612; 123/562
    See application file for complete search history.

(56) References Cited

U.S. PATENT DOCUMENTS

| | | | | |
|---|---|---|---|---|
| 4,930,315 A | * | 6/1990 | Kanesaka | 60/600 |
| 5,063,744 A | * | 11/1991 | Ishiyama et al. | 60/600 |
| 5,105,624 A | * | 4/1992 | Kawamura | 60/608 |
| 5,142,866 A | * | 9/1992 | Yanagihara et al. | 60/605.2 |
| 6,112,523 A | * | 9/2000 | Kamo et al. | 60/612 |
| 7,461,508 B2 | * | 12/2008 | Rosin et al. | 60/612 |
| 7,628,016 B2 | * | 12/2009 | Vogt | 60/612 |
| 7,703,284 B2 | * | 4/2010 | Becker et al. | 60/612 |
| 2002/0112478 A1 | * | 8/2002 | Pfluger | 60/612 |
| 2003/0074899 A1 | * | 4/2003 | Yamaguchi et al. | 60/612 |

(Continued)

FOREIGN PATENT DOCUMENTS

| | | | | | |
|---|---|---|---|---|---|
| JP | 61182421 A | * | 8/1986 | | F02B 37/00 |
| JP | 62113829 A | * | 5/1987 | | F02B 37/00 |

(Continued)

OTHER PUBLICATIONS

International Search Report mailed Jun. 9, 2009 issued in International Patent Application No. PCT/JP2009/054821 (with translation).

*Primary Examiner* — Kenneth Bomberg
*Assistant Examiner* — Paolo Isada
(74) *Attorney, Agent, or Firm* — Oliff PLC

(57) ABSTRACT

In the case where a low-pressure-side supercharging pressure acquired value corresponding to the pressure of inlet gas at the outlet of a low-pressure compressor operated in a twin supercharging mode is less than a target supercharging pressure in a single supercharging mode, changeover from the twin supercharging mode to the single supercharging mode is prohibited. Meanwhile, in the case where the low-pressure-side supercharging pressure acquired value is equal to or greater than the target supercharging pressure, the changeover from the twin supercharging mode to the single supercharging mode is permitted. Alternatively, in the case where a supercharging pressure during operation in the single supercharging mode is less than a target value of the pressure of supply gas at the outlet of the low-pressure compressor in the twin supercharging mode, changeover from the single supercharging mode to the twin supercharging mode is prohibited. Meanwhile, in the case where the supercharging pressure is equal to or greater than the target value, the changeover from the single supercharging mode to the twin supercharging mode is permitted.

7 Claims, 6 Drawing Sheets

(56) References Cited

U.S. PATENT DOCUMENTS

| | | | |
|---|---|---|---|
| 2006/0059910 A1* | 3/2006 | Spaeder et al. | 60/612 |
| 2006/0070381 A1* | 4/2006 | Parlow et al. | 60/612 |
| 2007/0062188 A1* | 3/2007 | Fry et al. | 60/599 |
| 2007/0062190 A1* | 3/2007 | Melchior | 60/605.1 |
| 2008/0173016 A1* | 7/2008 | Barthelet | 60/602 |
| 2009/0255517 A1* | 10/2009 | Ishikawa et al. | 123/562 |
| 2010/0180590 A1* | 7/2010 | Andreae et al. | 60/600 |
| 2011/0146634 A1* | 6/2011 | Iwatani et al. | 123/562 |

FOREIGN PATENT DOCUMENTS

| | | | | |
|---|---|---|---|---|
| JP | A-62-113829 | 5/1987 | | |
| JP | U-2-131030 | 10/1990 | | |
| JP | 03290028 A | * 12/1991 | | F02D 23/02 |
| JP | A-4-17724 | 1/1992 | | |
| JP | A-4-241730 | 8/1992 | | |
| JP | 06123232 A | * 5/1994 | | F02B 29/04 |
| JP | A-2005-146906 | 6/2005 | | |
| JP | 2010024878 A | * 2/2010 | | |

* cited by examiner (i)

(ii)

(iii)

(iv)

MULTISTAGE SUPERCHARGING SYSTEM CONTROL APPARATUS

TECHNICAL FIELD

The present invention relates to a multistage supercharging system control apparatus for controlling a multistage supercharging system which includes a high-pressure turbo charger and a low-pressure turbo charger disposed in series.

BACKGROUND ART

Conventionally known apparatuses of such a type are disclosed in, for example, Japanese Patent Application Laid-Open (kokai) Nos. S62-113829, H4-241730, and 2005-146906. Each of these apparatuses is configured to switch its supercharging mode by changing the states of supply of exhaust gas to a high-pressure turbo charger and a low-pressure turbo charger.

Specifically, in the apparatus disclosed in, for example, Japanese Patent Application Laid-Open No. 2005-146906, there are provided a bypass passage for bypassing the turbine of a high-pressure turbo charger, and an exhaust gas bypass valve for adjusting the flow rate of exhaust gas flowing through the bypass passage.

In such an apparatus, the opening of the above-mentioned exhaust gas bypass valve is adjusted in accordance with the operation state of an engine. Thus, the supercharging mode is switched. That is, within a range in which the engine rotational speed is low, supercharging is performed mainly by a small-sized, high-pressure turbo charger which is suitable for operation within a range of small flow rate (twin supercharging mode). Meanwhile, within a range in which the engine rotational speed is high, supercharging is performed by a large-sized, low-pressure turbo charger which is suitable for operation within a range of large flow rate (single supercharging mode).

DISCLOSURE OF THE INVENTION

A low-pressure turbo charger having a large capacity is likely to produce a response delay because its turbine has a large inertia. Therefore, an apparatus of such a type may cause problems, such as generation of a torque step and generation of smoke as a result of supercharging pressure becoming lower than a target value, at the time when the supercharging mode is switched.

An object of the present invention is to provide a multistage supercharging system control apparatus which controls a multistage supercharging system including a high-pressure turbo charger and a low-pressure turbo charger disposed in series and which can switch the supercharging mode of the system more properly.

<Configuration>

A multistage supercharging system to which the present invention is applied includes a high-pressure turbo charger and a low-pressure turbo charger interposed in an intake-exhaust passage of an internal combustion engine.

The high-pressure turbo charger includes a high-pressure turbine which is rotated and driven by exhaust gas, and a high-pressure compressor which is rotated and driven by the high-pressure turbine so as to pressurize supply gas. The low-pressure turbo charger includes a low-pressure turbine which is rotated and driven by exhaust gas at a location downstream of the high-pressure turbine with respect to an exhaust gas flow direction, and a low-pressure compressor which is rotated and driven by the low-pressure turbine so as to pressurize supply gas at a location upstream of the high-pressure compressor with respect to a supply gas flow direction.

The intake-exhaust passage is configured such that the supercharging mode can be switched between a twin supercharging mode and a single supercharging mode.

The twin supercharging mode is a supercharging mode in which exhaust gas is supplied to the low-pressure turbine via the high-pressure turbine, whereby supercharging is performed by the low-pressure compressor and the high-pressure compressor. In contrast, the single supercharging mode is a supercharging mode in which exhaust gas is supplied to the low-pressure turbine while being caused to bypass the high-pressure turbine, whereby supercharging is performed by the low-pressure compressor.

The multistage supercharging system control apparatus of the present invention controls a multistage supercharging system having such a configuration.

According to one aspect of the present invention, the present multistage supercharging system control apparatus comprises low-pressure-side supercharging pressure acquisition means, and supercharging mode changeover means.

The low-pressure-side supercharging pressure acquisition means is configured to acquire a low-pressure-side supercharging pressure acquired value corresponding to the pressure of supply gas at an outlet of the low-pressure compressor operated in the twin supercharging mode. The supercharging mode changeover means prohibits changeover from the twin supercharging mode to the single supercharging mode when the low-pressure-side supercharging pressure acquired value is less than a target supercharging pressure in the single supercharging mode, and permit the changeover from the twin supercharging mode to the single supercharging mode when the low-pressure-side supercharging pressure acquired value is equal to or greater than the target supercharging pressure (or when the low-pressure-side supercharging pressure acquired value exceeds the target supercharging pressure).

The multistage supercharging system control apparatus may further comprise low-pressure-side supercharging pressure increasing means. This low-pressure-side supercharging pressure increasing means is configured such that, when the low-pressure-side supercharging pressure acquired value is less than the target supercharging pressure in the single supercharging mode, the low-pressure-side supercharging pressure increasing means increases the pressure of supply gas at the outlet of the low-pressure compressor, while maintaining constant the supercharging pressure generated by the entire multistage supercharging system.

The high-pressure turbo charger may be a variable-geometry-type turbo charger having a variable nozzle provided at an exhaust gas inlet of the high-pressure turbine. When such a configuration is employed, the low-pressure-side supercharging pressure increasing means may be configured such that, when the low-pressure-side supercharging pressure acquired value is less than the target supercharging pressure in the single supercharging mode, the low-pressure-side supercharging pressure increasing means controls the variable nozzle to the closing side, while increasing the ratio of exhaust gas which bypasses the high-pressure turbine. In this case, the low-pressure-side supercharging pressure increasing means may be configured to control the variable nozzle on the open side with respect to an opening at which the efficiency of the high-pressure turbine becomes the highest.

The multistage supercharging system control apparatus may further comprise single-mode supercharging pressure acquisition means. This single-mode supercharging pressure acquisition means is configured to acquire a single-mode supercharging pressure acquired value corresponding to the supercharging pressure generated by the entire multistage supercharging system operated in the single supercharging mode.

When such a configuration is employed, the supercharging mode changeover means may be configured to prohibit changeover from the single supercharging mode to the twin supercharging mode when the single-mode supercharging pressure acquired value is less than a target value of the pressure of supply gas at the outlet of the low-pressure compressor in the twin supercharging mode, and permit the changeover from the single supercharging mode to the twin supercharging mode when the single-mode supercharging pressure acquired value is equal to or greater than the target value (or when the single-mode supercharging pressure acquired value exceeds the target value).

The single-mode supercharging pressure acquisition means may be configured to acquire a low-pressure-side supercharging pressure acquired value corresponding to the pressure of supply gas at the outlet of the low-pressure compressor.

According to another aspect of the present invention, the present multistage supercharging system control apparatus comprises single-mode supercharging pressure acquisition means, and supercharging mode changeover means.

The single-mode supercharging pressure acquisition means is configured to acquire a single-mode supercharging pressure acquired value corresponding to a supercharging pressure generated by the entire multistage supercharging system operated in the single supercharging mode. Notably, the single-mode supercharging pressure acquisition means may be configured to acquire the low-pressure-side supercharging pressure acquired value corresponding to the pressure of supply gas at the outlet of the low-pressure compressor.

The supercharging mode changeover means is configured to prohibit changeover from the single supercharging mode to the twin supercharging mode when the single-mode supercharging pressure acquired value is less than a target value of the pressure of supply gas at the outlet of the low-pressure compressor in the twin supercharging mode, and permit the changeover from the single supercharging mode to the twin supercharging mode when the single-mode supercharging pressure acquired value is equal to or greater than the target value (or when the single-mode supercharging pressure acquired value exceeds the target value).

<Action and Effects>

In the multistage supercharging system control apparatus of the present invention having the above-described configuration, when a request for changeover of the supercharging mode arises, a value corresponding to a supercharging pressure produced by the low-pressure compressor operated in the current supercharging mode (the above-mentioned low-pressure-side supercharging pressure acquired value or the above-mentioned single-mode supercharging pressure acquired value) is acquired.

When this acquired value is equal to or greater than a target value of the pressure of supply gas at the outlet of the low-pressure compressor in the supercharging mode after changeover (when the supercharging mode after the changeover is the single supercharging mode, a target supercharging pressure of the entire multistage supercharging system, which can be considered to be equal to the above-mentioned target value), typically, when the acquired value is greater than the target value, changeover to the requested supercharging mode is performed.

Therefore, in the multistage supercharging system control apparatus of the present invention, at the time of changeover of the supercharging mode, the pressure of supply gas at the outlet of the low-pressure compressor does not change, or changes such that the pressure decreases monotonously. Thus, at the time of changeover of the supercharging mode, the low-pressure turbo charger (the low-pressure turbine and the low-pressure compressor) having a large inertia is not required to be accelerated.

Accordingly, the present invention enables more proper changeover of the supercharging mode of the multistage supercharging system which includes the high-pressure turbo charger and the low-pressure turbo charger disposed in series.

BEST MODE FOR CARRYING OUT THE INVENTION

An embodiment of the present invention will next be described with reference to the drawings. Notably, as will be described later, naturally, the present invention is not limited to the specific configuration of the embodiment to be described below. Various modifications that can be made to the present embodiment are collectively described herein at the end, since insertion thereof into the description of the embodiment would disturb understanding of consistent description of the embodiment.

<Configuration of an Internal Combustion Engine System According to a First Embodiment>

Figure 1:
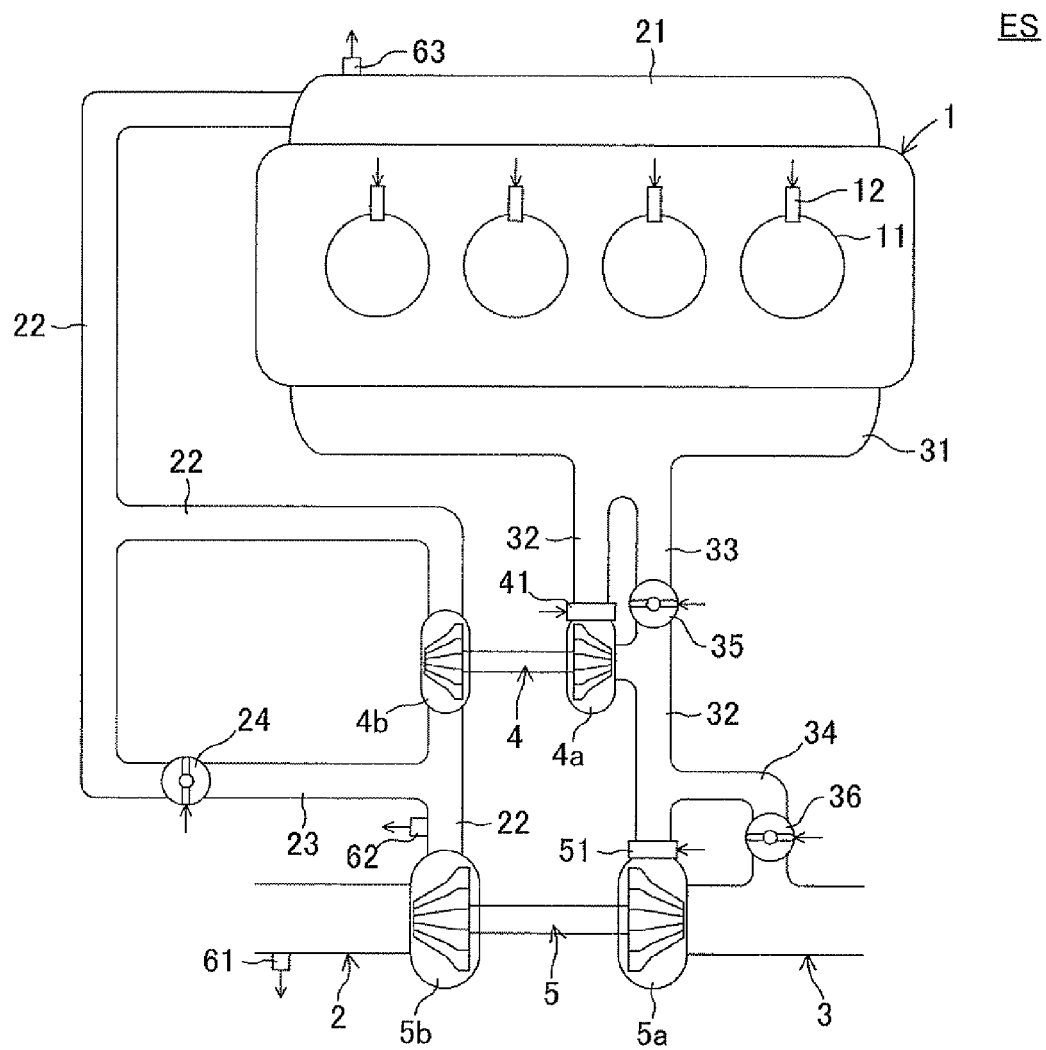
FIG. 1 is a schematic diagram showing the overall configuration of an internal combustion engine system to which one embodiment of the present invention is applied.
Figure 1:
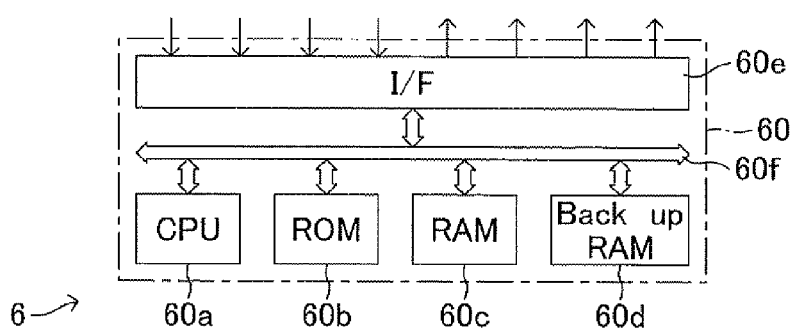

FIG. 1 is a schematic diagram showing the overall configuration of an internal combustion engine system ES to which one embodiment of the present invention is applied. As shown in FIG. 1, the internal combustion engine system ES includes an internal combustion engine 1, an intake passage 2, an exhaust passage 3, a high-pressure turbo charger 4 (including a high-pressure turbine 4a and a high-pressure compressor 4b), a low-pressure turbo charger 5 (including a low-pressure turbine 5a and a low-pressure compressor 5b), and a control apparatus 6.

The intake passage 2 and the exhaust passage 3 are connected to the internal combustion engine 1. The high-pressure turbo charger 4 and the low-pressure turbo charger 5 are interposed in the intake passage 2 and the exhaust passage 3. In the present embodiment, the high-pressure turbo charger 4 and the low-pressure turbo charger 5 are disposed in series. That is, the high-pressure turbine 4a is disposed upstream of the low-pressure turbine 5a with respect to the exhaust gas flow direction. Also, the high-pressure compressor 4b is disposed downstream of the low-pressure compressor 5b with respect to the intake gas flow direction. The control apparatus 6 controls operations of the internal combustion engine 1, the intake passage 2, the exhaust passage 3, the high-pressure turbo charger 4, and the low-pressure turbo charger 5.

The configurations of various portions of the internal combustion engine system ES according to the present embodiment will now be described in more detail. Notably, auxiliaries, such as an inter cooler and a catalyst, which are not related to the main portion of the present invention are not illustrated in the drawings.

In the present embodiment, the internal combustion engine 1 includes a plurality of (four) cylinders 11, which are formed and arranged in series. In this internal combustion engine 1, an injector 12 is provided for each cylinder 11 in order to supply fuel into the cylinder 11.

The intake passage 2 and the exhaust passage 3 are configured to enable switching of the supercharging mode between a twin supercharging mode and a single supercharging mode. The twin supercharging mode is a supercharging mode in which exhaust gas is supplied to the low-pressure turbine 5a via the high-pressure turbine 4a, whereby supercharging is performed by the low-pressure compressor 5b and the high-pressure compressor 4b. In contrast, the single supercharging mode is a supercharging mode in which exhaust gas is supplied to the low-pressure turbine 5a while being caused to bypass the high-pressure turbine 4a, whereby supercharging is performed by the low-pressure compressor 5b.

Specifically, the intake passage 2 of the present embodiment includes an intake manifold 21, a main intake passage 22, an intake gas bypass passage 23, and a supply gas changeover valve 24. The main intake passage 22 is provided to connect the intake manifold 21, the high-pressure compressor 4b, and the low-pressure compressor 5b in series.

The intake gas bypass passage 23 establishes communication between a portion of the main intake passage 22 located between the high-pressure compressor 4b and the low-pressure compressor 5b, and a portion of the main intake passage 22 located downstream of the high-pressure compressor 4b, whereby intake gas having passed through the low-pressure compressor 5b flows toward the intake manifold 21 while bypassing the high-pressure compressor 4b. A supply gas changeover valve 24 is interposed in the intake gas bypass passage 23. This supply gas changeover valve 24 adjusts the flow channel sectional area of the intake gas bypass passage 23 by changing its opening.

The exhaust passage 3 of the present embodiment includes an exhaust manifold 31, a main exhaust passage 32, a high-press-side exhaust gas bypass passage 33, a low-pressure-side exhaust gas bypass passage 34, an exhaust gas changeover valve 35, and an exhaust gas bypass valve 36. The main exhaust passage 32 is provided to connect the exhaust manifold 31, the high-pressure turbine 4a, and the low-pressure turbine 5a in series.

The high-pressure-side exhaust gas bypass passage 33 is provided so as to connect the exhaust manifold 31 and the low-pressure turbine 5a, while bypassing the high-pressure turbine 4a.

Specifically, the high-pressure-side exhaust gas bypass passage 33 is provided so as to establish communication between the exhaust manifold 31, and a portion of the main exhaust passage 32 located between the high-pressure turbine 4a and the low-pressure turbine 5a. That is, the high-pressure-side exhaust gas bypass passage 33 can supply exhaust gas to the low-pressure turbo charger 5 while detouring around the high-pressure turbo charger 4.

The low-pressure-side exhaust gas bypass passage 34 is provided so as to bypass the low-pressure turbine 5a. Specifically, the low-pressure-side exhaust gas bypass passage 34 is provided so as to establish communication between a portion of the main exhaust passage 32 located between the high-pressure turbine 4a and the low-pressure turbine 5a, and a portion of the main exhaust passage 32 located downstream of the low-pressure turbine 5a.

An exhaust gas changeover valve 35 is interposed in the high-pressure-side exhaust gas bypass passage 33. This exhaust gas changeover valve 35 adjusts the flow channel sectional area of the high-pressure-side exhaust gas bypass passage 33 by changing its opening.

That is, this exhaust gas changeover valve 35 switches the supercharging mode by adjusting the states of supply of exhaust gas to the high-pressure turbo charger 4 and the low-pressure turbo charger 5 by changing its opening.

An exhaust gas bypass valve 36 is interposed in the low-pressure-side exhaust gas bypass passage 34. This exhaust gas bypass valve 36 adjusts the flow channel sectional area of the low-pressure-side exhaust gas bypass passage 34 by changing its opening. That is, this exhaust gas bypass valve 36 adjusts the state of supply of exhaust gas to the low-pressure turbo charger 5 by changing its opening.

As described above, the high-pressure turbo charger 4 includes the high-pressure turbine 4a, which is rotated and driven by exhaust gas, and the high-pressure compressor 4b, which is rotated and driven through rotation of the high-pressure turbine 4a to thereby pressurize supply gas. In addition, the high-pressure turbo charger 4 includes a high-pressure-side variable vane nozzle 41. That is, in the present embodiment, the high-pressure turbo charger 4 is a so-called variable-geometry-type turbo charger. The high-pressure-side variable vane nozzle 41 is provided at an exhaust gas inlet of the high-pressure turbine 4a of the high-pressure turbo charger 4, and is configured to change the A/R ratio of the high-pressure turbine 4a by changing its opening.

Similarly, the low-pressure turbo charger 5 includes the low-pressure turbine 5a, which is rotated and driven by exhaust gas at a position downstream of the high-pressure turbine 4a with respect to the exhaust gas flow direction, and the low-pressure compressor 5b, which is rotated and driven through rotation of the low-pressure turbine 5a to thereby pressurize supply gas at a position upstream of the high-pressure compressor 4b with respect to the intake gas flow direction. In addition, the low-pressure turbo charger 5 includes a low-pressure-side variable vane nozzle 51.

That is, in the present embodiment, the low-pressure turbo charger 5 is a variable-geometry-type turbo charger whose maximum capacity is greater than that of the high-pressure-turbo charger 4. The low-pressure-side variable vane nozzle 51 is provided at an exhaust gas inlet of the low-pressure turbine 5a of the low-pressure turbo charger 5, and is configured to change the A/R ratio of the low-pressure turbine 5a by changing its opening.

<<Control Apparatus>>

The control apparatus 6, which is one embodiment of the multistage supercharging system control apparatus of the present invention, includes an electronic control unit 60 (hereinafter abbreviated to the "ECU 60") which constitutes the various means of the present invention.

The ECU 60 includes a Central Processing Unit (CPU) 60a, a ROM 60b, a RAM 60c, a backup RAM 60d, an interface 60e, and a bidirectional bus 60f. The CPU 60a, the ROM 60b, the RAM 60c, the backup RAM 60d, and the interface 60e are connected with one another via the bidirectional bus 60f.

The CPU 60a executes routines (programs) for controlling the operations of various portions of the internal combustion engine system ES. The routines to be executed by the CPU 60a, maps or the like, parameters, and other data, which are referred to when the routines are executed, are stored in the ROM 60b in advance. The expression "maps or the like" encompasses not only maps but also tables and relational equations. The same also applies to the following description.

The RAM 60c temporarily stores data if necessary when the CPU 60a executes the routines. The backup RAM 60d stores data if necessary when the CPU 60a executes the routines in a state in which a power supply is on, and holds the stored data even after the power supply is cut off.

The interface 60e is electrically connected to various sensors, which will be described later, and transmits detection signals from these sensors to the CPU 60a. Also, the interface 60e is electrically connected to operation devices, such as the injector 12, the supply gas changeover valve 24, the exhaust gas changeover valve 35, the exhaust gas bypass valve 36, the high-pressure-side variable vane nozzle 41, and the low-pressure-side variable vane nozzle 51.

The interface 60e transmits, from the CPU 60a to these operation devices, operation signals for operating these operation devices. That is, the ECU 60 is configured to acquire an operation state of the internal combustion engine 1 on the basis of output signals of the various sensors, and controls, on the basis of the operation state, the operation devices, including control of the amount and timing of injection of fuel from the injector 12.

An air flow meter 61 is provided along the intake passage 2 to be located upstream of the low-pressure turbine 5a, and generates an output voltage corresponding to the quantity of mass flow of intake air per unit time (intake air flow rate Ga). A low-pressure-side supercharging pressure sensor 62 is provided along the main intake passage 22 at a location immediately after the low-pressure compressor 5b, and generates an output voltage corresponding to the pressure of supply gas at the outlet of the low-pressure compressor 5b. A high-pressure-side supercharging pressure sensor 63 is attached to the intake manifold 21, and generates an output voltage corresponding to the final intake pressure; i.e., the supercharging pressure of the entire system.

<Outline of Operation>

Figure 2:
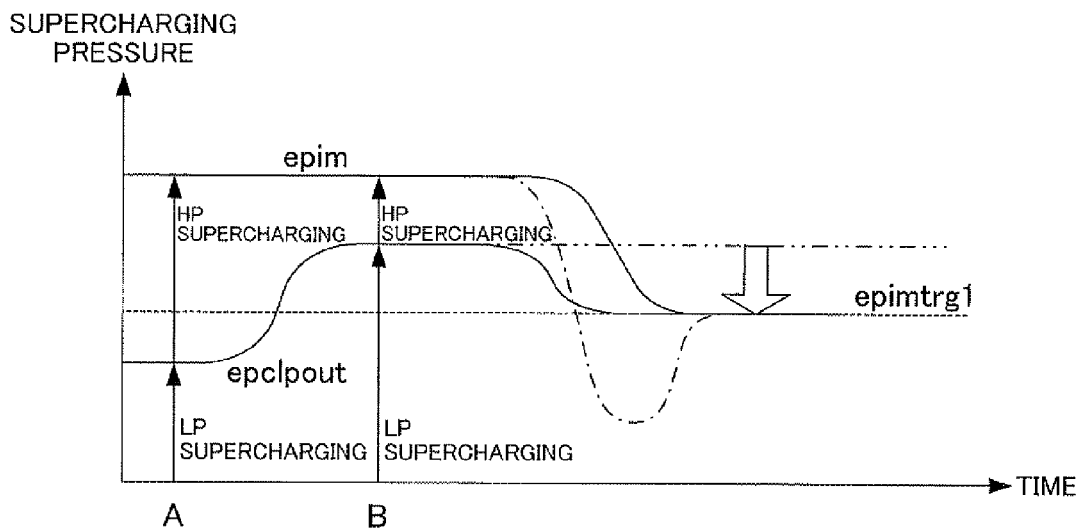
FIG. 2 is a graph showing the operation of the internal combustion engine system shown in FIG. 1.
Figure 2:
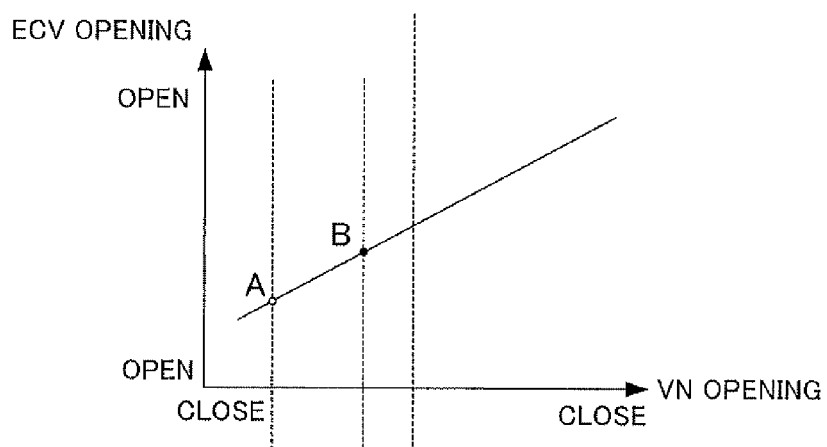
Figure 2:
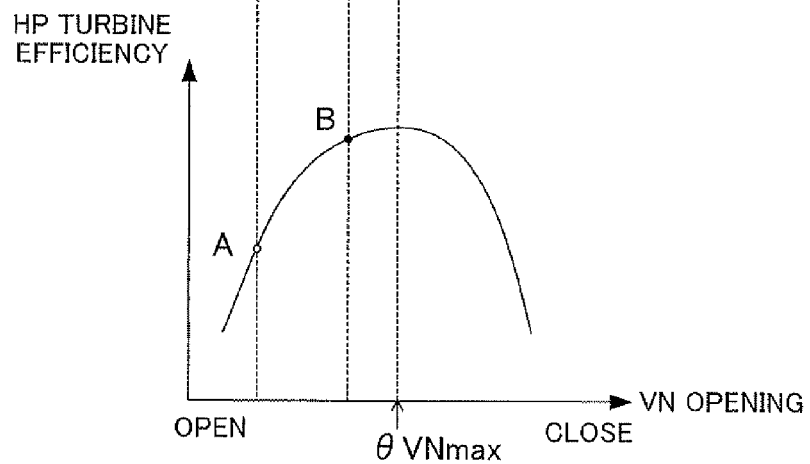
Figure 3:
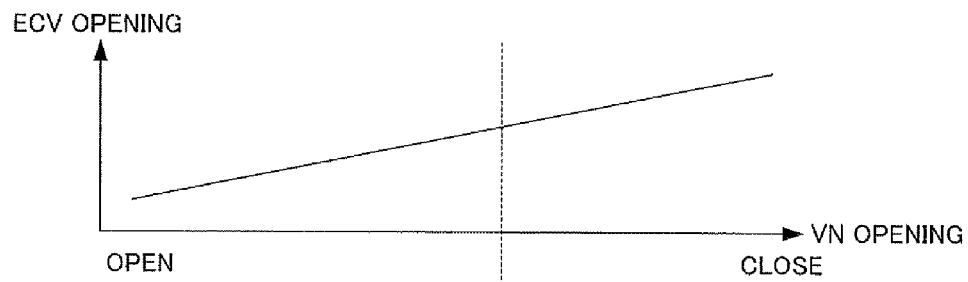
FIG. 3 is a graph showing the operation of the internal combustion engine system shown in FIG. 1.
Figure 3:
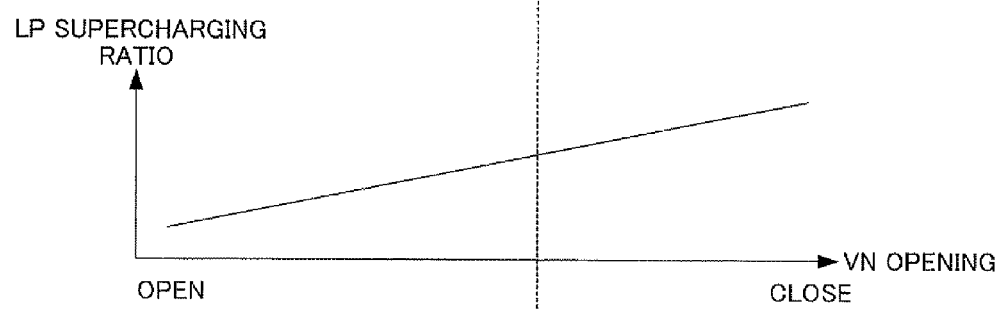
Figure 3:
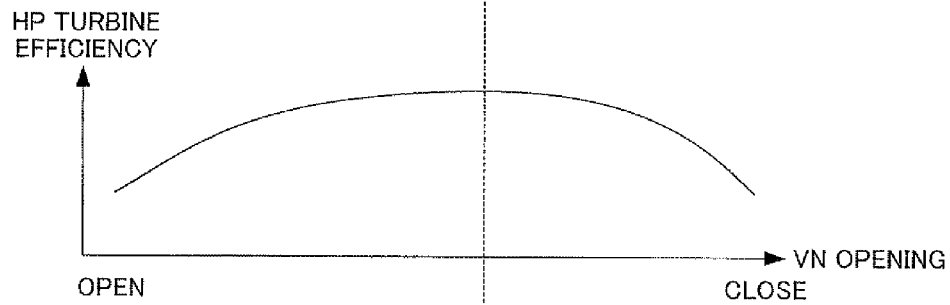
Figure 3:
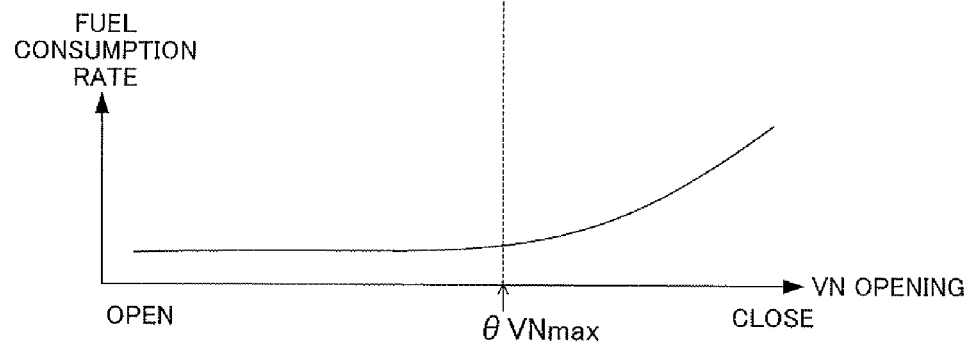
Figure 4:
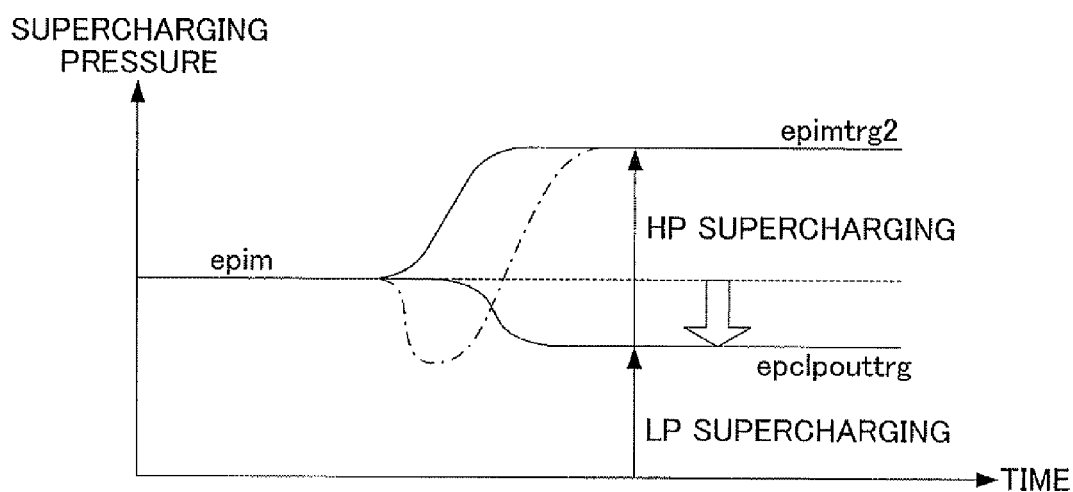
FIG. 4 is a graph showing the operation of the internal combustion engine system shown in FIG. 1.

FIGS. 2 to 4 are graphs showing operation of the internal combustion engine system ES shown in FIG. 1.

Section (i) of FIG. 2 shows a change in supercharging pressure at the time when the supercharging mode is switched from the twin supercharging mode to the single supercharging mode. Section (ii) of FIG. 2 shows the relation between the opening of the high-pressure-side variable vane nozzle 41 and the opening of the exhaust gas changeover valve 35 for the case where the supercharging pressure is controlled to be constant in the twin supercharging mode. Section (iii) of FIG. 2 shows the relation between the opening of the high-pressure-side variable vane nozzle 41 and the efficiency of the high-pressure turbine 4a.

Section (i) of FIG. 3 shows the relation between the opening of the high-pressure-side variable vane nozzle 41 and the opening of the exhaust gas changeover valve 35 for the case where the supercharging pressure is controlled to be constant in the twin supercharging mode (this graph corresponds to section (ii) of FIG. 2). Section (ii) of FIG. 3 shows the relation between the opening of the high-pressure-side variable vane nozzle 41 and the ratio of supercharging by the high-pressure turbo charger 4 in the twin supercharging mode for the case where the supercharging pressure is controlled to be constant in the twin supercharging mode. Section (iii) of FIG. 3 shows the relation between the opening of the high-pressure-side variable vane nozzle 41 and the efficiency of the high-pressure turbine 4a (this graph corresponds to section (iii) of FIG. 2). Section (iv) of FIG. 3 shows the relation between the opening of the high-pressure-side variable vane nozzle 41 and the rate of fuel consumption for the case where the supercharging pressure is controlled to be constant in the twin supercharging mode.

FIGS. 2 and 3 are drawn under the assumption that the greater the value of the "VN opening" (the closer to the right end in the drawings), the greater the degree to which the high-pressure-side variable vane nozzle 41 is closed (that is, when the VN opening=100%, the high-pressure-side variable vane nozzle 41 is fully closed).

FIG. 4 shows a change in the supercharging pressure at the time when the supercharging mode is switched from the single supercharging mode to the twin supercharging mode.

Next, the outline of operation of the internal combustion engine system ES according to the present embodiment will be described with reference to FIGS. 1 to 4.

<<Changeover from the Twin Supercharging Mode to the Single Supercharging Mode>>

Section (i) of FIG. 2 shows the case where the supercharging mode is switched directly to the single supercharging mode in a state in which the pressure (epclpout) of supply gas at the outlet of the low-pressure compressor 5b operated in the twin supercharging mode is lower than a target supercharging pressure (epimtrg1) in the single supercharging mode (see A in the drawing). In such a case, as shown by an alternating long and short dash line in the drawing, a large supercharging pressure step is produced.

In order to overcome such a drawback, in the present embodiment, when the pressure (epclpout) of supply gas at the outlet of the low-pressure compressor 5b operated in the twin supercharging mode is lower than the target supercharging pressure (epimtrg1) in the single supercharging mode, changeover from the twin supercharging mode to the single supercharging mode is prohibited. Meanwhile, when the pressure (epclpout) of supply gas at the outlet of the low-pressure compressor 5b operated in the twin supercharging mode is equal to or greater than the target supercharging pressure (epimtrg1) in the single supercharging mode (typically, when the pressure epclpout is higher than the target supercharging pressure epimtrg1), changeover from the twin supercharging mode to the single supercharging mode is permitted.

Specifically, in the case where a request for changeover of the supercharging mode from the twin supercharging mode to the single supercharging mode arises in the above-described state A, before changeover of the supercharging mode, the exhaust gas changeover valve 35 is driven in an open direction so as to increase the ratio of supercharging by the low-pressure turbo charger 5. Thus, the ratio of exhaust gas which bypasses the high-pressure turbine 4a increases, whereby the energy of exhaust gas supplied to the low-pressure turbo charger 5 increases (during that time changeover of the supercharging mode is waited; that is, is temporarily prohibited).

If the exhaust gas changeover valve 35 is operated in the open direction without changing the opening of the high-pressure-side variable vane nozzle 41, the energy of exhaust gas passing through the high-pressure turbine 4a decreases. As a result, a decrease in the ratio of supercharging by the high-pressure turbo charger 4 becomes larger than an increase in the ratio of supercharging by the low-pressure turbo charger 5. Therefore, the supercharging pressure produced by the entire system decreases.

In view of the above, when the exhaust gas changeover valve 35 is opened so as to increase the ratio of supercharging by the low-pressure turbo charger 5, the high-pressure-side variable vane nozzle 41 is driven in a closing direction in order to suppress the decrease in the supercharging pressure produced by the entire system.

With this operation, as shown in section (i) of FIG. 2, while the supercharging pressure (epim) produced by the entire system is maintained, there is created a state in which the pressure (epclpout) of supply gas at the outlet of the low-pressure compressor 5b operated in the twin supercharging mode becomes equal to or higher than the target supercharging pressure (epimtrg1) in the single supercharging mode (see B in the drawing). After such a state is created, the changeover of the supercharging mode is performed.

As described above, in the present embodiment, in the case where the supercharging system operates in the above-described state A in the twin supercharging mode when the request for changeover of the supercharging mode to the single supercharging mode arises, the supercharging system is first operated in the above-described state B, and the changeover of the supercharging mode to the single supercharging mode is then performed. Meanwhile, in the case where the supercharging system operates in the state B in the twin supercharging mode when the request arises, the supercharging mode of the supercharging system operating in the state B can be immediately switched to the single supercharging mode.

With this operation, when the pressure of supply gas at the outlet of the low-pressure compressor 5b changes as a result of changeover of the supercharging mode from the twin supercharging mode to the single supercharging mode, the pressure of supply gas decreases monotonously. That is, at the time of transition to the single supercharging mode, the supercharging pressure decreases monotonously toward the target supercharging pressure.

Therefore, a phenomenon in which the supercharging pressure in the single supercharging mode after the changeover becomes lower than the target supercharging pressure can be reliably prevented without the necessity of accelerating the low-pressure turbo charger 5 (the low-pressure turbine 5a and the low-pressure compressor 5b) having a large inertia, at the time of changeover of the supercharging mode. That is, the supercharging pressure is controlled to become equal to or greater than the target value, and generation of a supercharging pressure step as described above can be reliably prevented.

Therefore, the control apparatus of the present embodiment can satisfactorily prevent occurrence of malfunctions, such as torque step, smoke generation, and a drop of performance as a result of restriction of injection amount, which malfunctions would otherwise occur when the supercharging mode is switched from the twin supercharging mode to the single supercharging mode.

In the present embodiment, when the operation state shifts from the above-described state A to the above-described state B, the closing operation of the high-pressure-side variable vane nozzle 41 is performed in a state in which an opening (highest efficient opening θVNmax: for example, 60%) at which the efficiency of the high-pressure turbine 4a becomes the highest is set as an upper limit (this operation is performed under the assumption that the opening of the high-pressure-side variable vane nozzle 41 is feedback-controlled during the operation in the twin supercharging mode before the request for changeover of the supercharging mode to the single supercharging mode arises, such that the VN opening is greater than the highest efficient opening θVNmax). The reason why the upper limit is provided is as follows.

As shown in FIG. 3, in the case where the ratio of supercharging by the low-pressure turbo charger 5 is increased by the opening operation of the exhaust gas changeover valve 35, accompanied by the closing operation of the high-pressure-side variable vane nozzle 41, the fuel consumption rate becomes worse sharply in a region of the VN opening exceeding the highest efficient opening θVNmax (in a region on the right side of a broken line in the drawing). In contrast, in a region of the VN opening equal to or less than the highest efficient opening θVNmax (in a region on the left side of the broken line in the drawing), it is possible to suppress, to a possible extent, deterioration of the fuel consumption rate, while improving the efficiency of the high-pressure turbine 4a.

<<Changeover from the Single Supercharging Mode to the Twin Supercharging Mode>>

Referring to FIG. 4, in the case where the supercharging pressure (epim) generated by the entire system operating in the single supercharging mode is lower than the target value (epclpouttrg) of the pressure of supply gas at the outlet of the low-pressure compressor 5b in the twin supercharging mode after the changeover of the supercharging mode, the low-pressure turbo charger 5 (the low-pressure turbine 5a and the low-pressure compressor 5b) having a large inertia must be accelerated at the time of changeover of the supercharging mode.

Also, at the time of changeover from the single supercharging mode to the twin supercharging mode, both the supercharging by the high-pressure turbo charger 4 and the supercharging by the low-pressure turbo charger 5 must be increased. Therefore, the energy of exhaust gas tends to become insufficient.

Therefore, when the supercharging mode is switched in such a case, as shown by an alternating long and short dash line in the drawing, a large supercharging pressure step is produced.

In order to overcome such a drawback, in the present embodiment, in the case where the supercharging pressure (epim) generated by the entire system operating in the single supercharging mode (in this case, the supercharging pressure epim is considered to be equal to the pressure (epclpout) of supply gas at the outlet of the low-pressure compressor 5b) is less than the target value (epclpouttrg) of the pressure of supply gas at the outlet of the low-pressure compressor 5b in the twin supercharging mode, changeover from the single supercharging mode to the twin supercharging mode is prohibited.

In contrast, in the case where the supercharging pressure (epim) generated by the entire system operating in the single supercharging mode is equal to or greater than the target value (epclpouttrg) of the pressure of supply gas at the outlet of the low-pressure compressor 5b in the twin supercharging mode (typically, in the case where the supercharging pressure epim is higher than the target value epclpouttrg), changeover from the single supercharging mode to the twin supercharging mode is permitted.

With this operation, when the pressure of supply gas at the outlet of the low-pressure compressor 5b changes as a result of changeover of the supercharging mode from the single supercharging mode to the twin supercharging mode, the pressure of supply gas decreases monotonously.

Therefore, a phenomenon in which the supercharging pressure in the twin supercharging mode after the changeover becomes lower than the target supercharging pressure can be reliably prevented without the necessity of accelerating the low-pressure turbo charger 5 (the low-pressure turbine 5a and the low-pressure compressor 5b) having a large inertia, at the time of changeover of the supercharging mode. That is, the supercharging pressure is controlled to become equal to or greater than the target value, and generation of a supercharging pressure step as described above can be reliably prevented.

Therefore, the control apparatus of the present embodiment can satisfactorily prevent occurrence of malfunctions, such as torque step, smoke generation, and a drop of performance as a result of restriction of injection amount, which malfunctions would otherwise occur when the supercharging mode is switched from the single supercharging mode to the twin supercharging mode.

<Specific Example of Operation>

Next, a specific example of the operation of the control apparatus 6 of the present embodiment having the above-described configuration will be described. Notably, in the drawings showing flowcharts, "step" is abbreviated to "S."

<<Changeover from the Twin Supercharging Mode to the Single Supercharging Mode>>

Figure 5:
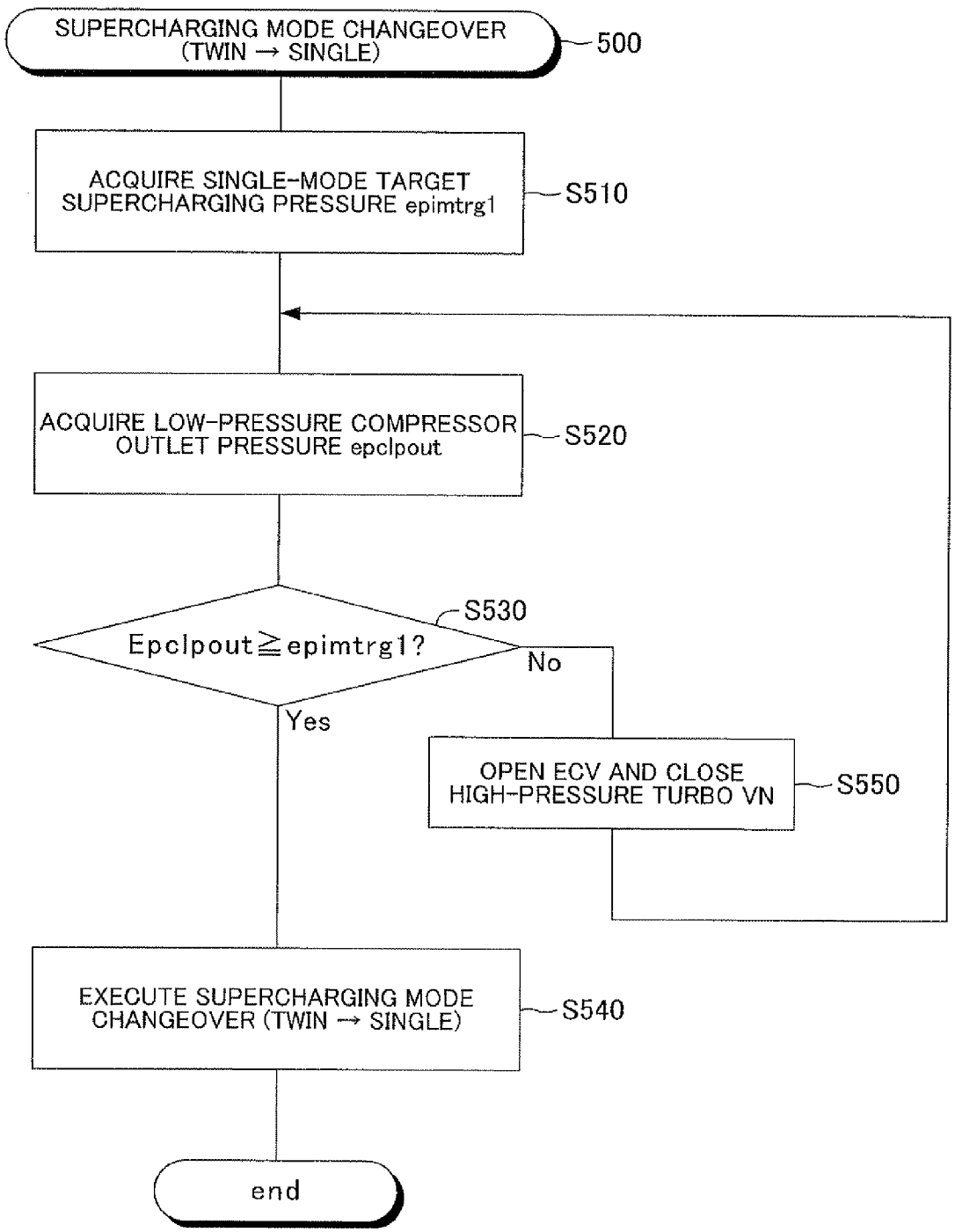
FIG. 5 is a flowchart showing a specific example of processing for supercharging mode changeover from a twin supercharging mode to a single supercharging mode, the processing being executed by the control apparatus of the present embodiment shown in FIG. 1.

FIG. 5 is a flowchart showing a specific example of processing for changeover of the supercharging mode from the twin supercharging mode to the single supercharging mode, which processing is performed by the control apparatus 6 (ECU 60) of the present embodiment shown in FIG. 1. The CPU 60a executes the supercharging mode changeover routine 500 shown in FIG. 5 upon occurrence of a request for changeover of the supercharging mode from the twin supercharging mode to the single supercharging mode.

When the processing of the routine 500 is started, the CPU 60a acquires the single-mode target supercharging pressure epimtrg1 in step 510. The acquisition of the single-mode target supercharging pressure epimtrg1 is performed on the basis of operation conditions acquired by various sensors (including unillustrated sensors such as an accelerator opening sensor), and maps or the like stored in the ROM 60b.

Next, in step 520, the CPU 60a acquires the low-pressure-compressor outlet pressure epclpout. In the present embodiment, the acquisition of the low-pressure-compressor outlet pressure epclpout is performed on the basis of the output of the lower-pressure-side supercharging pressure sensor 62. Subsequently, the CPU 60a proceeds to step 530 so as to determine whether or not the low-pressure-compressor outlet pressure epclpout is equal to or greater than the single-mode target supercharging pressure epimtrg1.

In the case where the low-pressure-compressor outlet pressure epclpout is equal to or greater than the single-mode target supercharging pressure epimtrg1 (step 530=Yes), the CPU 60a proceeds to step 540, and switches the supercharging mode from the twin supercharging mode to the single supercharging mode. Subsequently, the CPU 60a ends the present routine.

Meanwhile, in the case where the low-pressure-compressor outlet pressure epclpout is less than the single-mode target supercharging pressure epimtrg1 (step 530=No), the CPU 60a prohibits changeover of the supercharging mode at this timing, and proceeds to step 550.

In step 550, the CPU 60a opens the exhaust gas changeover valve 35 so as to increase the ratio of supercharging by the low-pressure turbo charger 5, and closes the high-pressure-side variable vane nozzle 41 so as to maintain the supercharging pressure generated by the entire system. Subsequently, the CPU 60a returns to step 520. After that, at a point in time when the low-pressure-compressor outlet pressure epclpout becomes equal to or greater than the single-mode target supercharging pressure epimtrg1 (step 530=Yes), the CPU 60a proceeds to step 540, and switches the supercharging mode from the twin supercharging mode to the single supercharging mode. Subsequently, the CPU 60a ends the present routine.

<<Changeover from the Single Supercharging Mode to the Twin Supercharging Mode>>

Figure 6:
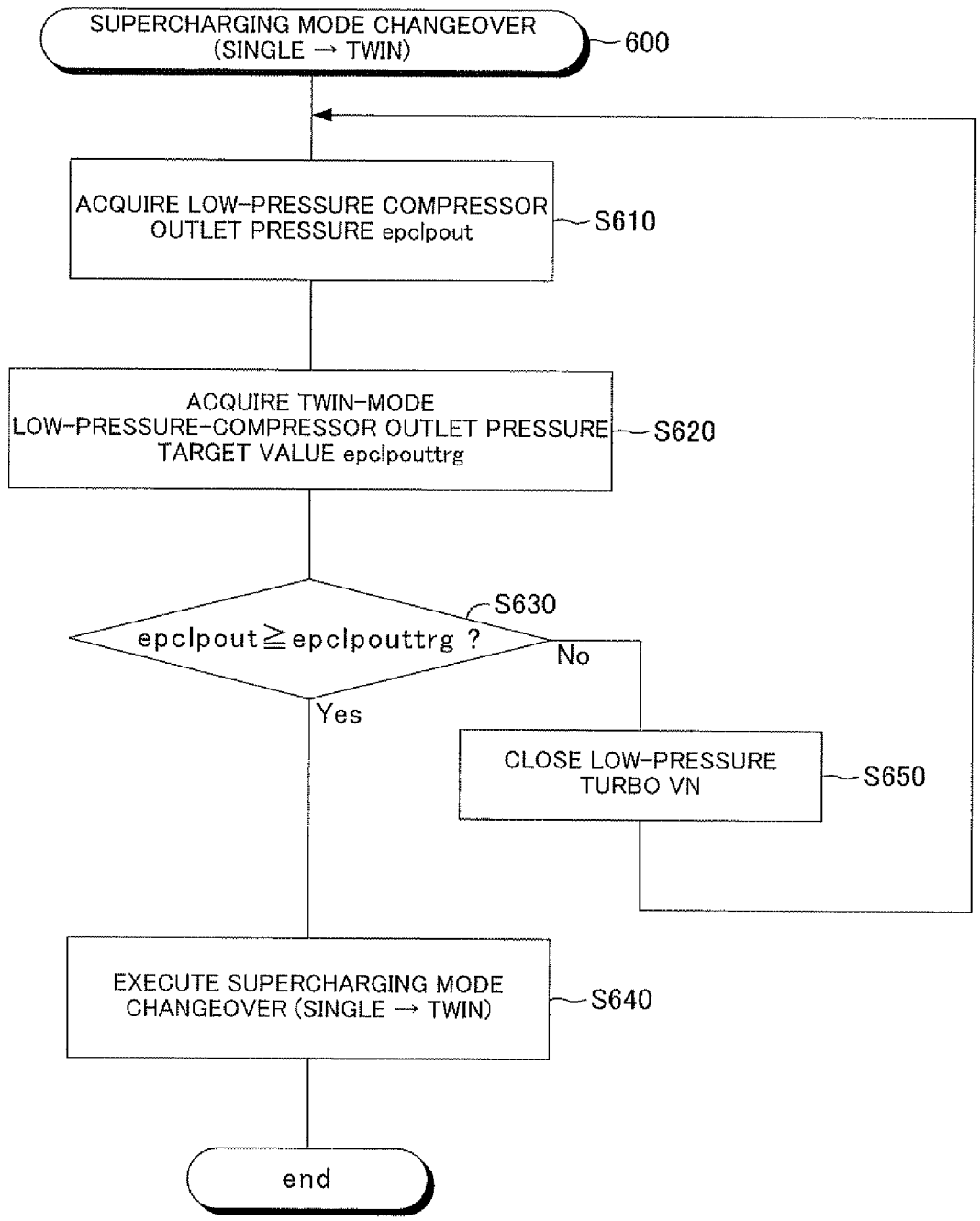
FIG. 6 is a flowchart showing a specific example of processing for supercharging mode changeover from the single supercharging mode to the twin supercharging mode, the processing being executed by the control apparatus of the present embodiment shown in FIG. 1.

FIG. 6 is a flowchart showing a specific example of processing for changeover of the supercharging mode from the single supercharging mode to the twin supercharging mode, which processing is performed by the control apparatus 6 (ECU 60) of the present embodiment shown in FIG. 1. The CPU 60a executes the supercharging mode changeover routine 600 shown in FIG. 6 upon occurrence of a request for changeover of the supercharging mode from the single supercharging mode to the twin supercharging mode.

When the processing of the routine 600 is started, in step 610, the CPU 60a first acquires the low-pressure-compressor outlet pressure epclpout, which can be considered to be equal to the supercharging pressure (epim) of the entire system operating in the single supercharging mode.

Next, in step 620, the CPU 60a acquires the twin-mode low-pressure-compressor outlet pressure target value epclpouttrg. The acquisition of the twin-mode low-pressure-compressor outlet pressure target value epclpouttrg is performed on the basis of operation conditions acquired by various sensors (including unillustrated sensors such as an accelerator opening sensor), and maps or the like stored in the ROM 60b.

Subsequently, the CPU 60a proceeds to step 630, and determines whether or not the low-pressure-compressor outlet pressure epclpout is equal to or greater than the twin-mode low-pressure-compressor outlet pressure target value epclpouttrg.

In the case where the low-pressure-compressor outlet pressure epclpout is equal to or greater than the twin-mode low-pressure-compressor outlet pressure target value epclpouttrg (step 630=Yes), the CPU 60a proceeds to step 640, and switches the supercharging mode from the single supercharging mode to the twin supercharging mode. Subsequently, the CPU 60a ends the present routine.

In contrast, in the case where the low-pressure-compressor outlet pressure epclpout is less than the twin-mode low-pressure-compressor outlet pressure target value epclpouttrg (step 630=No), the CPU 60a prohibits changeover of the supercharging mode at this timing, and proceeds to step 650.

In step 650, the CPU 60a closes the low-pressure-side variable vane nozzle 51. Subsequently, the CPU 60a returns to step 610. After that, at a point in time when the low-pressure-compressor outlet pressure epclpout becomes equal to or greater than the twin-mode low-pressure-compressor outlet pressure target value epclpouttrg (step 630=Yes), the CPU 60a proceeds to step 640, and switches the supercharging mode from the single supercharging mode to the twin supercharging mode. Subsequently, the CPU 60a ends the present routine.

<Modifications>

The above-described embodiment is, as mentioned above, a mere example of a best embodiment of the present invention which the applicant of the present invention contemplated at the time of filing the present application. Of course, the present invention is not limited to the above-described embodiment. Therefore, various modifications to the above-described embodiment are possible, so long as they do not change the essential portion of the invention.

Representative modifications will next be exemplified.

Needless to say, even modifications are not limited to those described below. The constitutions of the modifications to be described below are entirely or partially applicable in appropriate combination, so long as no technical inconsistencies are involved.

The present invention (particularly, constitute elements which constitute the means for solving the problems of the present invention and which are expressed operationally or functionally) should not be limitingly interpreted on the basis of the description of the above-described embodiment or the description of the following modifications. Such limiting interpretation impairs the interests of an applicant (particularly, an applicant who is motivated to file as quickly as possible under the first-to-file system) while unfairly benefiting imitators, and is thus impermissible.

For example, the present invention can be applied to gasoline engines, diesel engines, methanol engines, bio ethanol engines, and internal combustion engines of other arbitrary types. No particular limitation is imposed on the number of cylinders and the layout of the cylinders (straight type, V-type, horizontally-opposed type).

Also, the present invention is not limited to the specific control mode disclosed in the above-described embodiment.

For example, the state A shown in section (i) of FIG. 2 may be created as a result of a response delay of the low-pressure turbo charger 5, not as a result of the feedback control of the supercharging pressure. In such a case, the processing of step 550 of the flowchart of FIG. 5, which opens the exhaust gas changeover valve 35 and closes the high-pressure-side variable vane nozzle 41, can be replaced with processing of waiting for a certain period of time.

Instead of the low-pressure-compressor outlet pressure epclpout in the flowchart of FIG. 6, the supercharging pressure of the entire system (system supercharging pressure epim) acquired on the basis of the output of the high-pressure-side supercharging pressure sensor 63 can be used.

Also, the low-pressure-compressor outlet pressure epclpout and the system supercharging pressure epim can be obtained without use of the low-pressure-side supercharging pressure sensor 62 and the high-pressure-side supercharging pressure sensor 63. They can be estimated on board on the basis of other engine operation parameters, which are acquired on the basis of the outputs of other sensors such as the air flow meter 61.

Moreover, the sign of inequality in step 530 in the flowchart of FIG. 5 and in step 630 in the flowchart of FIG. 6 may be changed to a sign of inequality which does not include "equal" (needless to say, the descriptions of the above-described flowcharts may be changed accordingly).

Needless to say, other modifications which are not specifically mentioned here fall within the scope of the present invention, so long as such modifications do not change the essential portion of the present invention. Furthermore, those components which partially constitute means for solving the problems to be solved by the present invention and are operationally or functionally expressed encompass not only the specific structures disclosed in the above embodiment and modifications but also any other structures that can implement the operations or functions of the components.

Moreover, the contents (including specifications and drawings) of the prior application and publications cited herein can be incorporated herein by reference.

The invention claimed is:

1. A multistage supercharging system comprising:

a high-pressure turbocharger including a high-pressure turbine which is rotated and driven by exhaust gas, and a high-pressure compressor which is rotated and driven by the high-pressure turbine so as to pressurize supply air, the high-pressure turbocharger being a variable-geometry-type turbocharger having a variable nozzle provided at an exhaust gas inlet of the high-pressure turbine;

a low-pressure turbocharger including a low-pressure turbine which is rotated and driven by exhaust gas at a location downstream of the high-pressure turbine with respect to an exhaust gas flow direction, and a low-pressure compressor which is rotated and driven by the low-pressure turbine so as to pressurize supply air at a location upstream of the high-pressure compressor with respect to a supply air flow direction;

passages, including an intake passage and an exhaust passage, configured such that a supercharging mode is switched between a twin supercharging mode, realized at, at least one of a first range of speed and a first range of load, in which exhaust gas is supplied to the low-pressure turbine via the high-pressure turbine, whereby supercharging is performed by the low-pressure compressor and the high-pressure compressor, and a single supercharging mode, realized at, at least one of a second range of speed and a second range of load, the second range of speed being higher than the first range of speed, the second range of load being higher than the first range of load, the first and second range of speed not overlapping and the first and second range of load not overlapping, in which exhaust gas is supplied to the low-pressure turbine while being caused to bypass the high-pressure turbine, whereby supercharging is performed by the low-pressure compressor;

a memory having instructions; and a central processing unit for executing the instructions, the central processing unit, when executing the instructions, performing the steps of:

acquiring a low-pressure-side supercharging pressure acquired value corresponding to a pressure of supply air at an outlet of the low-pressure compressor operated in the twin supercharging mode;

prohibiting changeover from the twin supercharging mode to the single supercharging mode when the low-pressure-side supercharging pressure acquired value is less than a target supercharging pressure in the single supercharging mode, and permitting the changeover from the twin supercharging mode to the single supercharging mode when the low-pressure-side supercharging pressure acquired value is equal to or greater than the target supercharging pressure; and when the low-pressure-side supercharging pressure acquired value is less than the target supercharging pressure in the single supercharging mode, increasing the pressure of supply air at the outlet of the low-pressure compressor, while maintaining constant the supercharging pressure generated by the entire multistage supercharging system, wherein when the low-pressure-side supercharging pressure acquired value is less than the target supercharging pressure in the single supercharging mode, controlling the variable nozzle to the closing side, while increasing the ratio of exhaust gas which bypasses the high-pressure turbine; and controlling the variable nozzle on the open side with respect to an opening position at which the efficiency of the high-pressure turbine becomes the highest.

2. The multistage supercharging system control apparatus according to claim 1, wherein the central processing unit is further configured to perform steps comprising:
acquiring a single-mode supercharging pressure acquired value corresponding to the supercharging pressure generated by the entire multistage supercharging system operated in the single supercharging mode; and
prohibiting changeover from the single supercharging mode to the twin supercharging mode when the single-mode supercharging pressure acquired value is less than a target value of the pressure of supply air at the outlet of the low-pressure compressor in the twin supercharging mode, and
permitting the changeover from the single supercharging mode to the twin supercharging mode when the single-mode supercharging pressure acquired value is equal to or greater than the target value.

3. The multistage supercharging system control apparatus according to claim 2, wherein the central processing unit is further configured to perform acquiring a low-pressure-side supercharging pressure acquired value corresponding to the pressure of supply air at the outlet of the low-pressure compressor.

4. A multistage supercharging system comprising:
a high-pressure turbocharger including a high-pressure turbine which is rotated and driven by exhaust gas, and a high-pressure compressor which pressurizes supply air which is rotated and driven by the high-pressure turbine so as to pressurize supply air;
a low-pressure turbocharger including a low-pressure turbine which is rotated and driven by exhaust gas at a location downstream of the high-pressure turbine with respect to an exhaust gas flow direction, and a low-pressure compressor which is rotated and driven by the low-pressure turbine so as to pressurize supply air at a location upstream of the high-pressure compressor with respect to a supply air flow direction;
passages, including an intake passage and an exhaust passage, configured such that a supercharging mode is switched between a twin supercharging mode, realized at, at least one of a first range of speed and a first range of load, in which exhaust gas is supplied to the low-pressure turbine via the high-pressure turbine, whereby supercharging is performed by the low-pressure compressor and the high-pressure compressor, and a single supercharging mode, realized at, at least one of a second range of speed and a second range of load, the second range of speed being higher than the first range of speed and the second range of load being higher than the first range of load, the first and second range of speed not overlapping and the first and second range of load not overlapping, in which exhaust gas is supplied to the low-pressure turbine while being caused to bypass the high-pressure turbine, whereby supercharging is performed by the low-pressure compressor;
a memory having instructions; and
a central processing unit for executing the instructions, the central processing unit, when executing the instructions, performing the steps of:
acquiring a single-mode supercharging pressure acquired value corresponding to a supercharging pressure generated by the entire multistage supercharging system operated in the single supercharging mode; and
prohibiting changeover from the single supercharging mode to the twin supercharging mode when the single-mode supercharging pressure acquired value is less than a target value of the pressure of supply air at the outlet of the low-pressure compressor in the twin supercharging mode,
permitting the changeover from the single supercharging mode to the twin supercharging mode when the single-mode supercharging pressure acquired value is equal to or greater than the target value,
closing the low-pressure-side variable nozzle to increase the pressure of supply air at the outlet of the low-pressure compressor when the single-mode supercharging pressure acquired value is less than a target value, and
changing the mode from the single supercharging mode to the twin supercharging mode.

5. The multistage supercharging system control apparatus according to claim 4, wherein the central processing unit is further configured to perform acquiring a low-pressure-side supercharging pressure acquired value corresponding to the pressure of supply air at the outlet of the low-pressure compressor.

6. The multistage supercharging system control apparatus according to claim 1, wherein the central processing unit is further configured to perform:
closing the variable nozzle from an opening position at which an efficiency of the high-pressure turbine is not the highest toward an opening position at which the efficiency of the high-pressure turbine is the highest in order to increase the efficiency of the high-pressure turbine so that the pressure of supply air at the outlet of the low-pressure compressor is increased, and
increasing a ratio of exhaust gas which bypasses the high-pressure turbine so that the supercharging pressure generated by the entire multistage supercharging system is maintained constant.

7. The multistage supercharging system control apparatus according to claim 4, wherein the central processing unit is further configured to perform acquiring the low-pressure-side supercharging pressure acquired value corresponding to the pressure of supply gas at the outlet of the low-pressure compressor as the single-mode supercharging pressure acquired value.

* * * * *